United States Patent
Dey et al.

(10) Patent No.: US 10,019,309 B2
(45) Date of Patent: Jul. 10, 2018

(54) ANALYTICS-BASED DYNAMIC ADAPTATION OF CLIENT-SERVER MOBILE APPLICATIONS

(71) Applicant: International Business Machines Corporation, Armonk, NY (US)

(72) Inventors: Kuntal Dey, Bangalore (IN); Sougata Mukherjea, Bangalore (IN); Venkatraman Ramakrishna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/981,010

(22) Filed: Dec. 28, 2015

(65) Prior Publication Data

US 2017/0185475 A1 Jun. 29, 2017

(51) Int. Cl.
G06F 11/00 (2006.01)
G06F 11/07 (2006.01)

(52) U.S. Cl.
CPC ........ *G06F 11/0793* (2013.01); *G06F 11/079* (2013.01); *G06F 11/0751* (2013.01)

(58) Field of Classification Search
CPC ............. G06F 11/3664; G06F 11/3692; G06F 11/0751; G06F 11/0793; G06F 11/3006;
(Continued)

(56) References Cited

U.S. PATENT DOCUMENTS

| 6,112,024 | A * | 8/2000 | Almond | G06F 8/71 707/999.202 |
| 6,704,778 | B1 * | 3/2004 | Horman | H04L 41/0803 709/220 |

(Continued)

FOREIGN PATENT DOCUMENTS

WO 2014130988 A2 8/2014

OTHER PUBLICATIONS

Larman, "Iterative and Incremental Development: A Brief History", 2003, IEEE, pp. 1-10.*
VMware, "Accelerate software development, testing and deploymnet with VMware virtualization platform", 2006, VMware, pp. 1-12.*
Spataru, "Agile development methods for mobile applications", 2010, University of Edinburgh, pp. 1-68.*
Crameri, "Staged deployment in Mirage, an integrated software upgrade testing and distribution system", 2007, ACM, pp. 1-16.*
(Continued)

*Primary Examiner* — Bryce P Bonzo
*Assistant Examiner* — Jeison C Arcos
(74) *Attorney, Agent, or Firm* — Ryan, Mason & Lewis, LLP (57) ABSTRACT

Methods, systems, and computer program products for analytics-based dynamic adaptation of client-server mobile applications are provided herein. A computer-implemented method includes detecting faults arising from execution of application instances of a distributed mobile device application among multiple client devices; separating the multiple client devices into an experimental group and a control group; determining user controls of the distributed mobile device application related to the detected faults; transmitting commands to each application instance among the experimental group of client devices that disables the user controls; transmitting commands to each application instance among the experimental group and the control group of client devices that includes remedial actions pertaining to the detected faults; verifying that the remedial actions resolved the detected faults; and transmitting commands, subsequent to said verifying, to each application instance among the experimental group of client devices that enables the user controls.

20 Claims, 4 Drawing Sheets

(58) Field of Classification Search
CPC ........ G06F 11/3058; G06F 6/048; G06F 8/65; G06F 8/71; G06F 8/76; G06F 9/445
See application file for complete search history.

(56) References Cited

U.S. PATENT DOCUMENTS

| | | | |
|---|---|---|---|
| 6,785,706 B1* | 8/2004 | Horman | H04L 41/0843 709/203 |
| 8,516,308 B1* | 8/2013 | Gill | H04L 67/34 714/26 |
| 8,731,966 B2 | 5/2014 | Breitenstein et al. | |
| 8,892,954 B1* | 11/2014 | Gray | G06F 8/65 714/15 |
| 8,949,674 B2 | 2/2015 | Mancoridis et al. | |
| 8,997,081 B1* | 3/2015 | Manion | G06F 8/65 717/168 |
| 2003/0051236 A1* | 3/2003 | Pace | G06F 8/60 717/177 |
| 2006/0190806 A1* | 8/2006 | Sasson | G06F 9/451 715/202 |
| 2006/0265708 A1* | 11/2006 | Blanding | G06F 8/61 717/174 |
| 2009/0100272 A1* | 4/2009 | Smeets | G06F 21/121 713/189 |
| 2010/0159898 A1* | 6/2010 | Krzyzanowski | G06F 9/4445 455/414.1 |
| 2010/0223560 A1* | 9/2010 | Shenfield | G06F 9/546 715/744 |
| 2011/0093773 A1* | 4/2011 | Yee | G06F 17/30896 715/235 |
| 2012/0151446 A1* | 6/2012 | Sathya | G06F 11/3656 717/125 |
| 2013/0076750 A1* | 3/2013 | Park | G09G 3/36 345/428 |
| 2014/0137246 A1 | 5/2014 | Baluda et al. | |
| 2015/0026522 A1* | 1/2015 | Young | G06Q 30/0243 714/38.1 |
| 2015/0074650 A1* | 3/2015 | Bennett | G06F 11/3688 717/125 |
| 2015/0363302 A1* | 12/2015 | Young | G06F 11/3688 717/130 |
| 2017/0091077 A1* | 3/2017 | Manion | G06F 11/3668 |

OTHER PUBLICATIONS

Martin, "Here and now mobile learning: An experimental study on the use of mobile technology", 2013, Elsevier, pp. 1-10.*
Minelli et al. Software Analytics for Mobile Applications—Insights & Lessons Learned, Software Maintenance and Reengineering (CSMR), 2013.
Wikipedia, A/B Testing, https://en.wikipedia.org/w/index.php?title=A/B_testing&oldid=695778767, Dec. 18, 2015.

* cited by examiner

ANALYTICS-BASED DYNAMIC ADAPTATION OF CLIENT-SERVER MOBILE APPLICATIONS

FIELD

The present application generally relates to information technology, and, more particularly, to mobile application management.

BACKGROUND

Performing fault detection and root cause analysis for web and mobile applications present multiple challenges. For example, existing approaches are commonly carried out offline and manually, thereby leading to cost and/or resources issues as well as the inability to adapt mobile applications at runtime.

SUMMARY

In one embodiment of the present invention, techniques for analytics-based dynamic adaptation of client-server mobile applications are provided. An exemplary computer-implemented method can include detecting one or more faults arising from execution of application instances of a distributed mobile device application among at least a portion of multiple client devices, separating the at least a portion of the multiple client devices into (i) an experimental group and (ii) a control group, and determining one or more user controls of the distributed mobile device application related to the one or more detected faults. Such a method can also include transmitting a first set of one or more remote commands to each application instance among the experimental group of client devices, wherein the first set of one or more remote commands disables the one or more user controls of the distributed mobile device application related to the one or more detected faults. Additionally, such a method can include transmitting a second set of one or more remote commands to each application instance among (i) the experimental group of client devices and (ii) the control group of client devices, wherein the second set of one or more remote commands comprises one or more remedial actions pertaining to the one or more detected faults. Further, such a method can also include verifying that the one or more remedial actions resolved the one or more detected faults arising from execution of the application instances of the distributed mobile device application among the control group of client devices, and transmitting a third set of one or more remote commands, subsequent to said verifying, to each application instance among the experimental group of client devices, wherein the third set of one or more remote commands enables the one or more user controls of the distributed mobile device application related to the one or more detected faults.

In another embodiment of the invention, an exemplary computer-implemented method can include examining multiple device attributes of the at least a portion of multiple client devices to determine one or more of the multiple device attributes that are common across the at least a portion of multiple client devices, and determining one or more user controls of the distributed mobile device application related to the one or more detected faults based on (i) the one or more of the multiple device attributes that are common across the at least a portion of multiple client devices and (ii) a pre-computed dependency graph that describes how different user controls depend on each other.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes analytics-based dynamic adaptation of client-server mobile applications. By way of illustration, consider the following example scenario of a bookstore application (app) running on a mobile device. The app offers three main functions, and is configured with suitable controls for a user to invoke a function of his/her choice: (i) browsing the inventory of the bookstore, (ii) checking the account status of the user, and (iii) purchasing books. In an example scenario, purchases (via the app) initiated from a particular location keep failing, and an analytics tool generates alerts along with a pattern of the types of transactions that are failing.

For a better user experience and to suppress the number of alerts generated, in at least one embodiment of the invention, the relevant user control on the app (for example, a button marked "Pay") can be disabled and a warning displayed, instead of allowing unsuspecting users to continue to initiate futile transactions. In addition, other user controls that have no purpose other than to lead the user to a "Pay" button (for example, a "Proceed to Payment" button in the view containing the user's shopping list) can also be disabled to prevent the user from wasting time progressing to futile transactions.

At least one embodiment of the invention includes implementing analytics-based dynamic adaptation of mobile applications that are built on a distributed client-server model. Such an embodiment can include encompassing applications that run on mobile devices and periodically communicate with remote servers for services. Via such an embodiment, users can interact with the front-end, or client applications running on their mobile devices through controls and widgets that are programmed to perform defined functions. Additionally, one or more user controls can be mapped to functions programmed into the back-end server counterparts of these applications.

In one or more embodiments of the invention, invocation of a user control results in a client-server interaction that may succeed or fail to perform the task that the user intended. When it is suspected or confirmed that one or more server functions are malfunctioning, adaptations encompassed by one or more embodiments of the invention can disable the front-end user controls that depend on those server functions on specific mobile application instances that are suspected of triggering the malfunction. Additionally, once a malfunction is fixed or remedied, the adaptations encompassed by one or more embodiments of the invention can re-enable front-end user controls available on those mobile application instances.

Accordingly, and as further detailed herein, one or more embodiments of the invention include implementing AB split testing to automatically determine whether a particular fault has been fixed, thereby leading to automatic removal of the related disablement that was imposed. Moreover, at least one embodiment of the invention includes disabling controls on devices in batches, and subsequently re-enabling the controls in batches after (i) fixing the problem and (ii) verifying that the faulty functions are working after re-enablement.

At least one embodiment of the invention includes dynamically determining fail patterns for a mobile application using clustering and/or analysis of a user dependency graph, as well as turning on/off various features in mobile applications interfaces at run-time based on the dynamic determinations. As detailed herein, such dynamic determinations can be carried out over multiple instances of mobile applications simultaneously, wherein such instances may be running on hundreds or thousands of mobile devices at a given instant. Utilizing such techniques, at least one embodiment of the invention can include identifying device and contextual patterns that can be linked to failing application instances.

Figure 1:
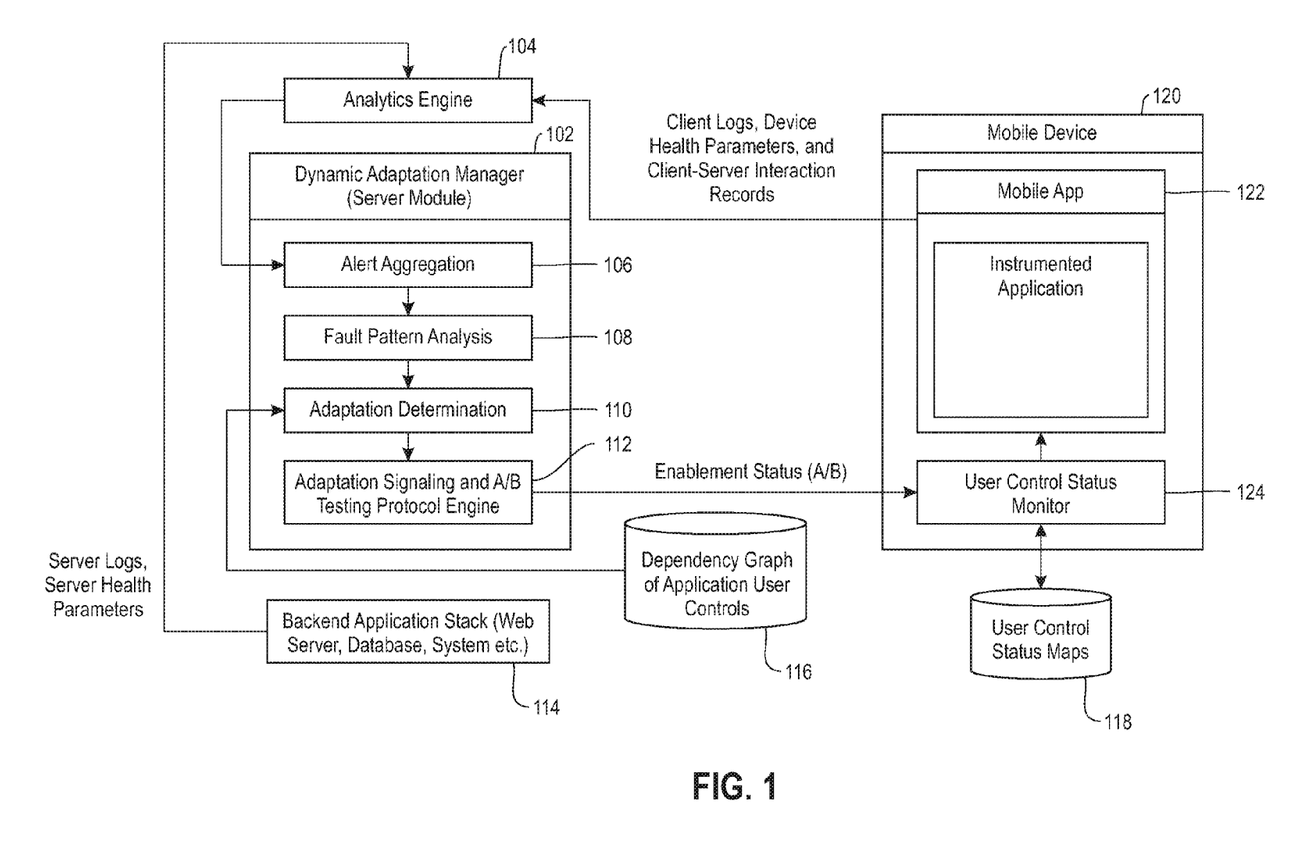
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an analytics engine 104, as well as a dynamic adaptation manager (server module) 102, which includes an alert aggregation component 106, a fault pattern analysis component 108, an adaptation determination component 110, and an adaptation signaling and A/B testing protocol engine 112. Additionally, FIG. 1 depicts a backend application stack 114 (which can include a web server, a database, a system, etc.), a database 116 of dependency graphs of application user controls, and a database 118 of user control status maps. Further, FIG. 1 depicts a mobile device 120, which includes an instrumented application 122 and a user control status monitor component 124.

The analytics engine 104 analyzes log data to generate alerts, wherein each alert potentially signifies an application failure. These alerts are sent to the alert aggregation component 106, which aggregates (that is, clusters and classifies) the alerts (over multiple application instances running over multiple devices) in order to eliminate duplicates across application instances and devices, and to determine a set of potentially unique alerts (wherein each alert maps to a single application bug). The aggregated alerts flow from the alert aggregation component 106 to the fault pattern analysis component 108. For each detected alert, at least one embodiment of the invention includes determining a characteristic set of device attributes that exhibit symptoms related to the alert. Additionally, a set of fault and/or alert patterns are computed via the fault pattern analysis component 108 and output to the adaptation determination component 110.

Subsequently, the adaptation determination component 110 determines the list of components to be enabled/disabled, and this list is passed to the adaptation signaling and A/B testing protocol engine 112. In one or more embodiments of the invention, this determination is carried out using a pre-computed dependency graph. Commands to set the state of specific components to "enabled" or "disabled" (such commands can include the component identity and enable/disable status) are sent from the adaptation signaling and A/B testing protocol engine 112 to the user control status monitor component 124. The dependency graph of the application is stored in database 116, and is transmitted from database 116 to the adaptation determination component 110 to determine an adaptation (using the dependency graph). Database 118 stores the user control status maps that are transmitted to the user control status monitor component 124 during control status retrieval, and whenever the control status changes, as indicated by the remote command received by the user control status monitor component 124 from the adaptation signaling and A/B testing protocol engine 112. Such information flows from the user control status monitor component 124 to database 118 for storing. Additionally, as used herein, the user control status maps are maps that indicate whether a particular user control is currently enabled or disabled. Each such map is retrieved immediately after the user control status monitor component 124 receives remote commands from the adaptation signaling and A/B testing protocol engine 112.

The analytics engine 104 runs on one or more servers at the backend and is implemented to monitor the distributed application's client-server activity and its underlying infrastructure (mobile devices, server-side components, and network) to detect faults, run diagnostics to determine what server-side application components are malfunctioning, and generate notifications related thereto. By way of example, the diagnostics can include one or more diagnostics algorithms implemented using pre-configured policies and learning modules.

The server module 102 runs at the backend and is implemented to listen for notifications from the analytics engine 104, determine a list of user controls on mobile application clients that need to be disabled (while debugging) and/or enabled (after bugs are fixed), and send remote commands to affected mobile application instances. In one or more embodiments of the invention, the server module can receive feedback from the analytics engine 104 through periodic polling, callback notifications, and/or alerts generated by the engine. Additionally, the server module can maintain a dependency graph of user controls within a mobile application that enables determination of the complete set of user controls having status needs to be toggled (that is, "enabled" to "disabled," or vice versa). In at least one embodiment of the invention, the server module can also determine a characteristic pattern (device type, location context, network type, etc.) of application instances that are failing, and send remote commands to mobile devices running those instances to toggle the status of the relevant user controls.

Additionally, the mobile application instrumentation framework (for example, embedded in a mobile application such as mobile app 122 in FIG. 1) is implemented to add program hooks for dynamic runtime adaptation of client behavior based on commands received from the remote server module. Adding hooks into the application can be carried out, for example, by augmenting the source code with application programming interface (API) invocations and annotations. Example invocations and annotations can include "if-else" logic blocks or program guards in program code that check the status of components involved in performing an operation (wherein such a component status can be fetched from database 118 via the user control status monitor 124 into the program running in mobile application 122, per the example embodiment of the invention depicted in FIG. 1). The added hooks enable the server module to dynamically change the user interface and the behavior of the application by sending remote commands. Also, in one or more embodiments of the invention, the mobile application instrumentation framework maintains state information about whether and how the current version of the application deviates from the normal full application version (whether and which some components have been disabled, etc.). Such deviation information can be used, for example, to detect anomalies and thereby generate alerts. Further, the mobile application instrumentation framework can record application run-time traces, or, alternatively, record application run-time events of interest.

Further, the AB split testing protocol (via component 112) can be run by the server module to disable a subset of affected app instances, verify malfunction fixes, and/or send enablement commands in stages to the disabled instances. In at least one embodiment of the invention, a subset of mobile app instances (for example, 90%, randomly chosen) can be selected for user control disablement, while the remaining instances serve as a control group. The server module sends disablement commands to the selected instances, and after a malfunction fix is rolled-out to the back-end server components, the analytics engine 104 monitors client-server activity to verify that the control group instances are functioning properly. If a malfunction subsequently still exists, alerts are raised again until a new malfunction fix is rolled-out, and this cycle can continue until the analytics engine 104 verifies that the malfunction has been fixed. Additionally, enablement signals can be sent to all selected group instances, at once or in stages, after verifying that the selected subset of instances are functioning properly based on feedback from the analytics engine.

As detailed herein in connection with one or more embodiments of the invention, target mobile applications operate in a client-server setting, wherein the target mobile applications include (i) a client running on the end-user's mobile device, (ii) a server running at the application provider's backend, and (iii) a network that connects the client and the server. As noted above and further described herein, the mobile applications can be monitored by an end-to-end analytics engine that continuously monitors the client, the server, and the network, and identifies anomalies, errors and/or warnings. On finding errors and/or warnings, the end-to-end analytics engine can generate and publish one or more alerts, as well as provide logs correlated across all of the client and server components (such as the front-end mobile app, the backend web/application server, the back-end database, and the system from which the backend servers run).

Examples of errors and warnings can include database password failures, unauthorized database access issues, application logic failures at the front-end and/or the back-end, network delay related warnings and client timeout errors, etc., identified by hypertext transfer protocol (HTTP) response codes, HTTP response messages and/or log record analysis for all of the app components.

At least one embodiment of the invention can additionally include facilitating user control of a dependency graph. Manipulating a user control can result in other (zero or more) user controls being available to a user of a mobile application, and available options and sequences can be encoded in the application logic. In an example embodiment of the invention, launching of the app can be considered a single starting point (or user control) for the user, and zero or more user control options are available on the default interface. All user controls available to a user can thus be modeled as a directed graph in the shape of a tree, referred to herein as the dependency graph for the app. "Launching of the app" can be set, for example, as the root of the tree.

Additionally, one or more embodiments of the invention can include automatically determining the set of widgets/user controls to enable and/or disable by analyzing the dependency graph. By way of illustration, if a parent node has a single child node, and the child node needs to be disabled, at least one embodiment of the invention can include disabling the parent node as well. Such actions can be carried out, for example, via one or more tree traversal algorithms. At least one embodiment of the invention can also include disabling widgets/user controls based on one or more user-configured policies. Such policies can include, by way of example, a list of user controls, a pattern (such as any user control containing the keyword "pay," for example), etc.

Further, one or more embodiments of the invention can include determining device profiles for faulty application instances. For each identified fault, the analytics engine can examine attributes of the devices running those app instances that triggered the faults. Such attributes to be examined can include the operating system, the device model, the location of the device, the network carrier of the devices causing the error, etc. A goal of such an embodiment of the invention includes determining the largest possible set of attribute values that is common to devices running the failing application.

Additionally, in at least one embodiment of the invention, adaptation targets can be selected from the set of devices that match the one or more inferred attribute patterns. If no such pattern is discernible, one or more embodiments of the invention include broadcasting messages (via the server module) to all devices running the failing application.

Accordingly, at least one embodiment of the invention includes implementing a pattern inference algorithm. By way of example, for every attribute a in device attribute set A, and for every unique value $v_a$ of a, such an embodiment includes determining the failure rate percentage $f_{va}$ for the application under consideration. Referring, for example, to FIG. 1, the analytics engine 104 monitors and/or keeps track of the total number of instances of a matching attribute ($v_a$), as well as the number of failed instances among them. Further, the failure rate set $\{f_{va}\}$ can be classified into two categories: (i) high-value and (ii) low-value. The high/low setting can be carried out manually or automatically, following application domain-specific policies. Additionally, the high/low setting can be carried out using statistical and clustering (for example, k-means) methods in combination with user-defined policies specifying what rate of failure is tolerable.

In carrying out a pattern inference algorithm, one or more embodiments of the invention can additionally include utilizing statistical methods such as deviation from the mean, k-means clustering, etc., as well as using static policies (thresholds and bounds, for example) framed using domain knowledge. Further, at least one embodiment of the invention can include returning the high-value set containing zero or more attribute values: $\{hv_a\}$, a subset of $\{v_a\}$. The above-mentioned methods and policies can be used to determine whether the behavior of the application is currently too different as compared to the expected behavior. This is determined by high deviation from the mean, clusters where the centroids are much higher than the expected position of the centroids, etc. For example, a 2-means clustering algorithm will separate out the set of failure percentages into two distinct group of values. One group will contain lower values clustered around a "normal" rate, and the other group will contain high/outlier values. To further separate outliers using domain knowledge, a user may specify a domain-dependent (manual) threshold for what constitutes a failure rate. This can be domain-dependent.

Additionally, the product of non-null high-value sets of all attributes can be obtained as follows: $\{hv_{a1}\} \times \{hv_{a2}\} \times \{hv_{a3}\}$ . . . . Tuples can be listed in the form ($hv_{a1}$, $hv_{a2}$, $hv_{a3}$, . . . ), and for each tuple in the product set, at least one embodiment of the invention includes determining the combined failure rate as follows: ($hv_{a1}$, $hv_{a2}$, $hv_{a3}$, . . . )→$cf_{hva}$. The combined failure rate set $\{cf_{hva}\}$ can be classified into one of (i) a high-value category and (ii) a low-value category. Further, the union of attribute values tuples corresponding to the high-value failure rates inferred in the previous step can be returned as the set of device patterns that are associated with the failing app instances.

It should be appreciated, however, that the above is merely an example candidate algorithm implemented in connection with one or more embodiments of the invention to infer failing device patterns, and that one or more additional and/or separate algorithms can be utilized as well.

By way merely of illustration, consider the following example use case scenario that includes disabling a functionality from a user app (a book store app) for a single client. For instance, the user attempts to pay for a book from the book store app. However, the payment fails twice successively, with application timeout due to high round-trip time (RTT). In response, the backend analytics engine raises an alert, and an example embodiment of the invention further includes analyzing whether or not the server is performing well as far as workload is concerned, and also determining whether or not other clients are able to pay while the user's payments are failing.

Further, client logs can be streaming from the user's device intermittently, and the example embodiment of the invention can include inferring that the user's current network bandwidth is insufficient based thereupon. Subsequently, the example embodiment can include sending a signal to the client side of the app installed on the user's device. This signal represents the control signal with the instruction to disable a specific set of functions (such as, for example, the make payment button on a check-out page) so that the user cannot use that specific set of functions because of some reason (in this example, the reason being insufficient network bandwidth for completion of the operation). Additionally, assume that the user is reattempting to buy the book by going back to the "make payment" activity of the app, but the user observes that the "pay" button has been disabled and receives a push notification that the payment button has been disabled due to poor network conditions. Accordingly, the user can retry, for example, after a few minutes or when he or she is confident about the network bandwidth.

By way of further illustration, consider the following example use case scenario that includes modifying an app for all users using a particular device model. For instance, assume that a mobile game app uses both a gyroscope and an accelerometer to determine motion in devices having both sensors, and in devices with only an accelerometer, the device only uses that sensor. The readings derived from the sensors are transmitted to the server in an HTTP call, and the server determines the subsequent action or step based on the readings.

Additionally, in this example use case scenario, assume that a game starts crashing for a new model of a device. Analysis (in this example) indicates that the particular HTTP call is failing because although the device has a gyroscope, code is failing when attempting to utilize the sensor. Accordingly, at least one embodiment of the invention includes dynamically adapting the app to use only the accelerometer. As such, users can continue playing the game app even on the new device model.

By way of yet further illustration, consider the following example use case scenario that includes disabling a functionality from a user app en masse for phones of a particular manufacturer (Manufacturer1) in a particular geographic region. In this example scenario, assume that User1, User2, and User3 all attempt to pay for books from a book store app around similar times, across different devices (their own Manufacturer1 devices) in the same geographic region (Region1). Also, User 4 and User 5 are trying to pay for books from the same app around similar times from Region2 and Region3, respectively, (again, from their own Manufacturer1 devices) and User 6 is trying to pay from a Manufacturer2 device in Region1 for a book from the same book store app.

The payments fail repeatedly for User1, User2, and User3, but User4, User5, and User6 can successfully pay for their books. Accordingly, the backend analytics engine raises an alert, and an example embodiment of the invention includes analyzing that the payments are failing for all of the Manufacturer1 devices in Region1. However, other devices (such as Manufacturer2 devices) and other regions (such as Region2) are not experiencing similar problems. Consequently, at least one embodiment of the invention can include inferring that there is a problem for Manufacture 1 devices in Region 1.

As such, in accordance with one or more embodiments of the invention, the next time a user opens the book store app from a Manufacturer1 device in Region1, the server can send a signal to the client device to disable the pay button with a probability of 0.9 (this is used for the AB split testing). As detailed herein in connection with one or more embodiments of the invention, the probability value is a user-configured decimal/percentage. For example, if 90% is selected, that means that 90% of the failing devices are selected to be in the experimental group, and the remaining 10% of the failing devices are to be in the control group (which are not experiencing the disabling of the relevant function(s)). Thus, when these 90% of the total Region1 user-base using Manufacturer1 devices proceed to the payment page (or otherwise, as a proactive notification), those users are told that the pay button will not work due to a general failure, and that the users should check back after some given period of time. The remaining 10% of the users in Region1 using Manufacturer1 devices will continue seeing the pay button as enabled, and whenever such a user uses the pay button, the payment fails and this failure gets logged to the framework. Users outside Region1, and users of non-Manufacturer1 devices in Region1 are not impacted; 100% of such users will have the pay button enabled.

Further, assume that the pay button has a parent—the "select book" checkbox—that has no other child (for example, no other button to "view book details"). Accordingly, for Manufacturer1 device users in Region1, for all of the app instances wherein the pay button is disabled, the select book checkbox is also disabled. In the meantime, an aggregate (cumulative) failure alert is generated and a notification is sent to the system administrators (admins) and software admins, indicating that there is a technical issue with Region1-based payments made from Manufacturer1 devices. A trigger process can subsequently be commenced that computes the estimated fraction of transactions (and the implied server load) that is generated from the pay method invocation from Manufacturer1 devices in Region1 based upon observed data and observations made over historical data. As used herein, observed data indicate what is happening currently, while historical data determine the expected behavior of the application. In the interim, the system administrators can fix the problem.

In an extension of this example use case scenario, at least one embodiment of the invention can include determining, over an additional period of time, that 10% of the users that use Manufacturer1 devices and are from Region1 can pay without any further errors. Hence, for the new app instances spawned on Manufacturer1 devices in Region1, the disabling message no longer needs to be sent to any instance (down to 0% from 90%), and all new app instances are fully functional, including the pay button and its (recursive) parents.

Figure 2:
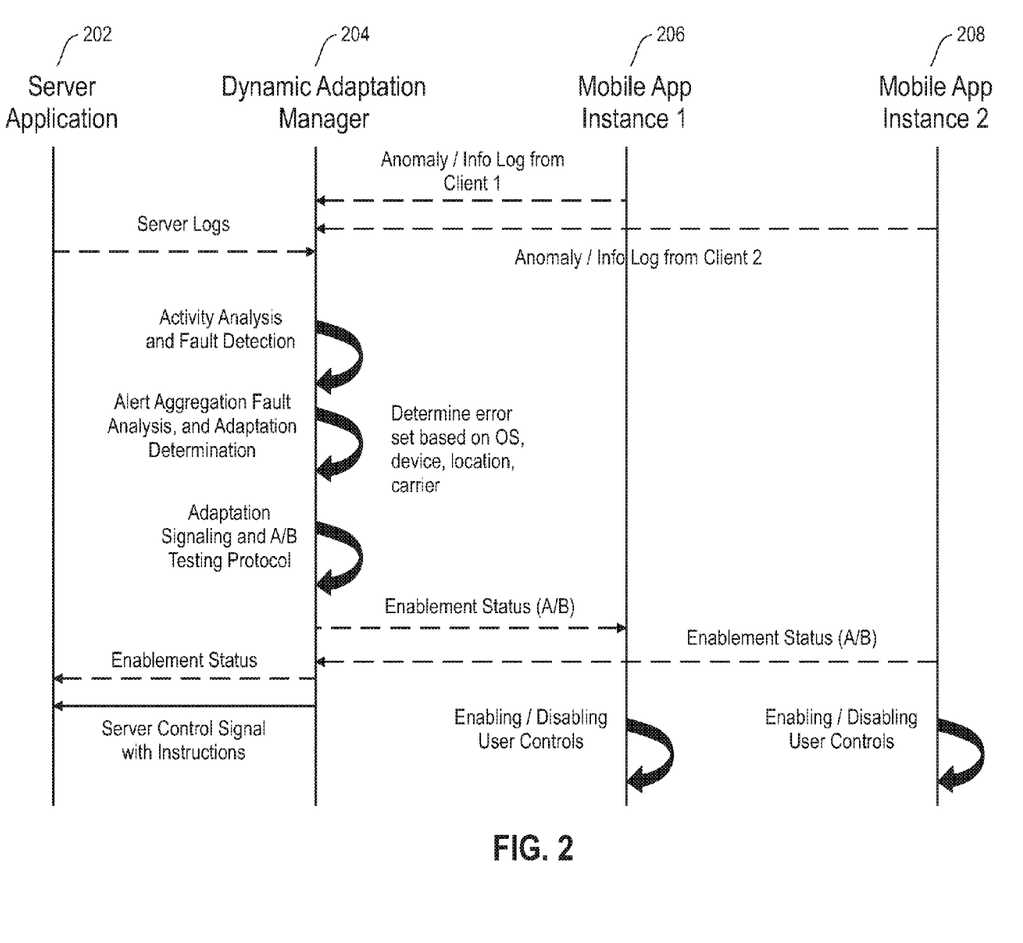
FIG. 2 is a diagram illustrating a workflow, according to an exemplary embodiment of the invention.

FIG. 2 is a diagram illustrating a workflow, according to an exemplary embodiment of the invention. By way of illustration, and in conjunction with the descriptions of one or more embodiments of the invention herein, FIG. 2 depicts a workflow between a server application 202, a dynamic adaptation manager 204, a first mobile app instance 206, and a second mobile app instance 208. Specifically, as depicted in FIG. 2, the server logs and the client logs from different mobile app instances are sent from the server application 202 to the dynamic app adaptation manager 204. Then, within the dynamic app adaptation manager 204, activity analysis and fault detection are carried out. It is noted that each large curved arrow in FIG. 2 indicates computation within one block, not involving any data transfer across any pair of blocks. Subsequently, within the dynamic app adaptation manager 204, alert aggregation, fault analysis and adaptation determination are carried out, which is followed by adaptation signal generation that is transmitted to the different client app instances (206 and 208), along with the enablement status. The probabilistic number-based enablement generation for AB testing applicable to faulty components is also carried out at this stage, before transmitting the signal to the different client app instances (206 and 208). The enablement status and control signal can optionally be sent to the server side as well.

Figure 3:
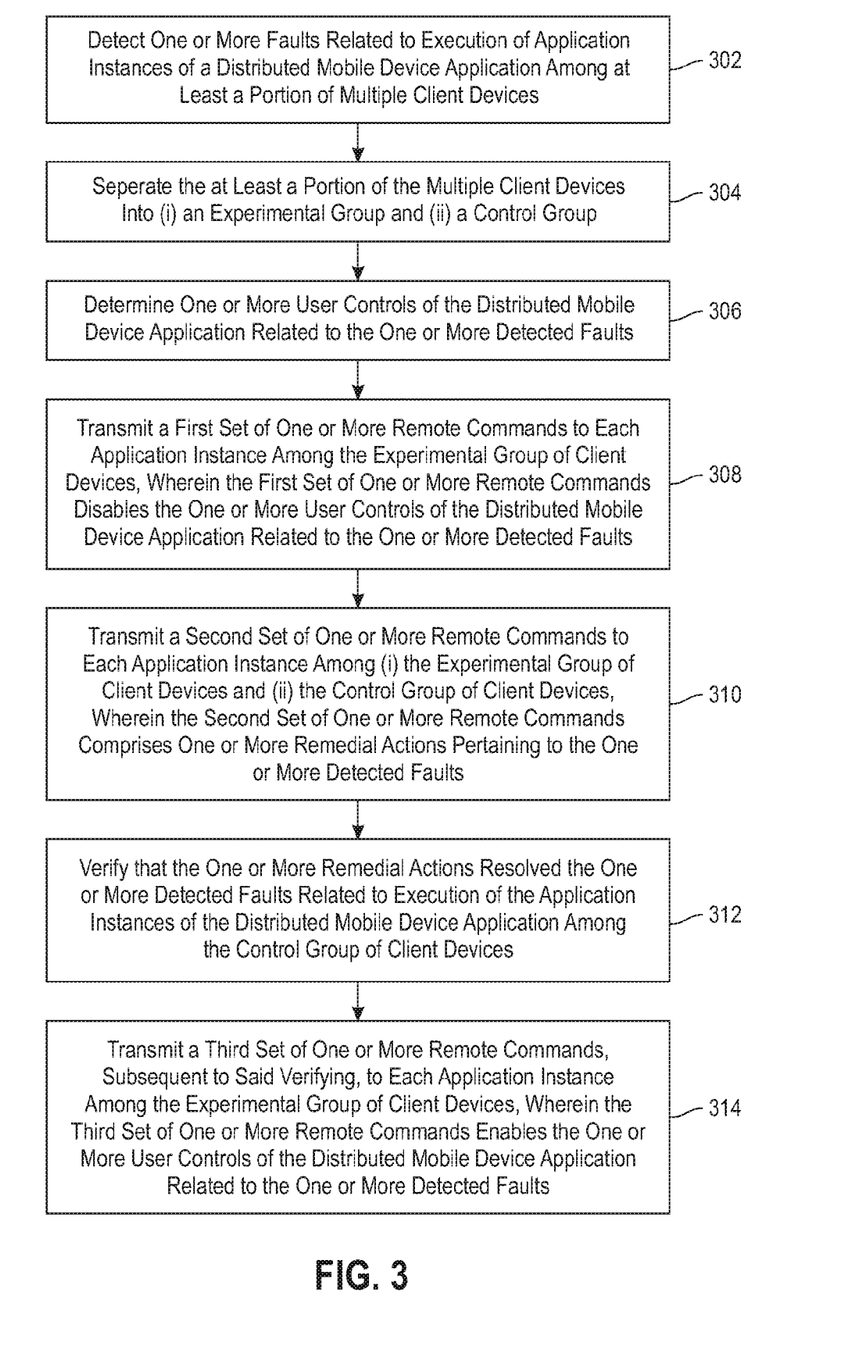
FIG. 3 is a flow diagram illustrating techniques according to an embodiment of the invention.

FIG. 3 is a flow diagram illustrating techniques according to an embodiment of the present invention. Step 302 includes detecting one or more faults arising from execution of application instances of a distributed mobile device application among at least a portion of multiple client devices. Detecting can include monitoring client device-server activity of the distributed mobile device application across the multiple client devices. The one or more faults can include one or more malfunctioning server-side application components. Additionally, at least one embodiment of the invention can include generating one or more notifications related to the one or more faults.

Step 304 includes separating the at least a portion of the multiple client devices into (i) an experimental group and (ii) a control group. Separating can include (i) marking a pre-determined percentage of the client devices as being part of the experimental group and (ii) marking a pre-determined percentage of the client devices as being part of the control group. Also, the pre-determined percentages can be based on a user-defined policy.

Step 306 includes determining one or more user controls of the distributed mobile device application related to the one or more detected faults. Determining can include identifying a characteristic pattern of the application instances associated with the one or more detected faults. The characteristic pattern can include a device type pattern, a location context pattern, and/or a network type pattern. Also, as detailed herein, each of the one or more user controls is programmed to perform one or more defined functions within an instance of the distributed mobile device application.

Step 308 includes transmitting a first set of one or more remote commands to each application instance among the experimental group of client devices, wherein the first set of one or more remote commands disables the one or more user controls of the distributed mobile device application related to the one or more detected faults.

Step 310 includes transmitting a second set of one or more remote commands to each application instance among (i) the experimental group of client devices and (ii) the control group of client devices, wherein the second set of one or more remote commands comprises one or more remedial actions pertaining to the one or more detected faults.

Step 312 includes verifying that the one or more remedial actions resolved the one or more detected faults arising from execution of the application instances of the distributed mobile device application among the control group of client devices. Verifying can include monitoring client device-server activity of the distributed mobile device application across the control group of client devices.

Step 314 includes transmitting a third set of one or more remote commands, subsequent to said verifying, to each application instance among the experimental group of client devices, wherein the third set of one or more remote commands enables the one or more user controls of the distributed mobile device application related to the one or more detected faults.

The techniques depicted in FIG. 3 can also include adding one or more program hooks for dynamic runtime adaptation of client device behavior based on the one or more remote commands, wherein adding the one or more program hooks can include augmenting source code associated with the distributed mobile device application with one or more application programming interface invocations and annotations.

Also, an additional embodiment of the invention can include examining multiple device attributes of the at least a portion of multiple client devices to determine one or more of the multiple device attributes that are common across the at least a portion of multiple client devices, and determining one or more user controls of the distributed mobile device application related to the one or more detected faults based on (i) the one or more of the multiple device attributes that are common across the at least a portion of multiple client devices and (ii) a pre-computed dependency graph that describes how different user controls depend on each other.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
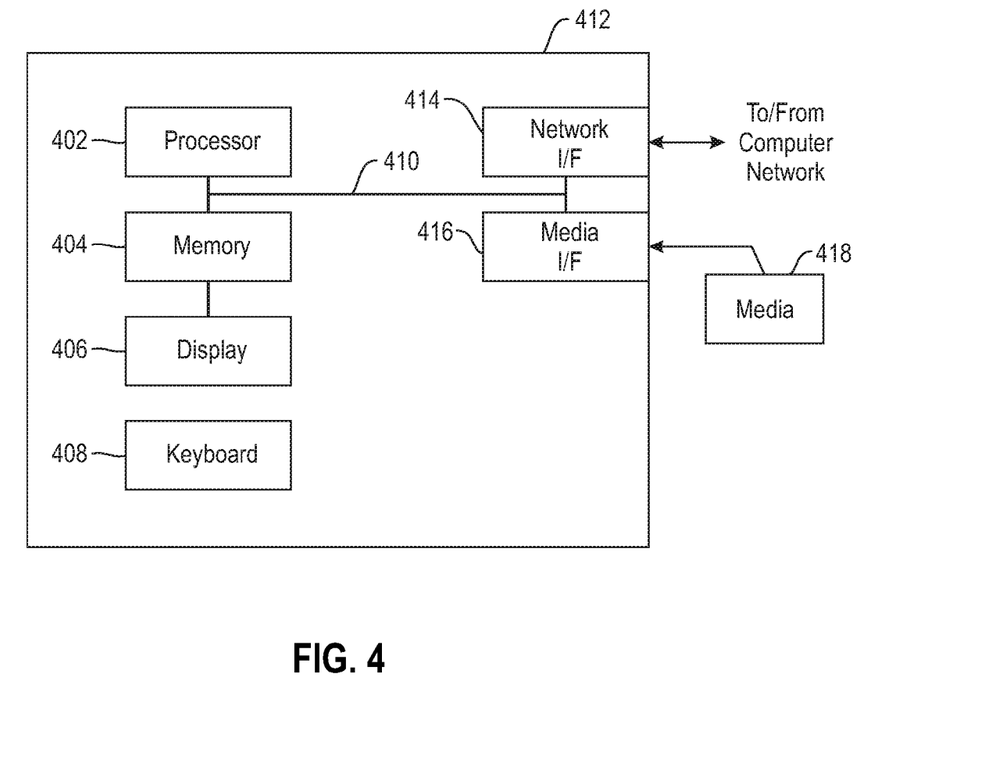
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dynamically determining fail patterns for a mobile application and turning on/off the features in mobile applications interfaces at runtime.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
 detecting one or more faults arising from execution of application instances of a distributed mobile device application among at least a portion of multiple client devices;
 separating the at least a portion of the multiple client devices into (i) an experimental group and (ii) a control group;
 determining one or more user controls of the distributed mobile device application to be related to the one or more detected faults;
 transmitting a first set of one or more remote commands to each application instance among the experimental group of client devices, wherein the first set of one or more remote commands disables the one or more user controls of the distributed mobile device application related to the one or more detected faults;
 transmitting a second set of one or more remote commands to each application instance among (i) the experimental group of client devices and (ii) the control group of client devices, wherein the second set of one or more remote commands comprises one or more remedial actions pertaining to the one or more detected faults;
 verifying that the one or more remedial actions resolved the one or more detected faults arising from execution of the application instances of the distributed mobile device application among the control group of client devices; and
 transmitting a third set of one or more remote commands, subsequent to said verifying, to each application instance among the experimental group of client devices, wherein the third set of one or more remote commands enables the one or more user controls of the distributed mobile device application related to the one or more detected faults;
 wherein the steps are carried out by at least one computing device.

2. The computer-implemented method of claim 1, wherein said one or more faults comprise one or more malfunctioning server-side application components.

3. The computer-implemented method of claim 1, comprising:
 generating one or more notifications related to the one or more faults.

4. The computer-implemented method of claim 1, wherein said determining comprises identifying a characteristic pattern of the application instances associated with the one or more detected faults.

5. The computer-implemented method of claim 4, wherein the characteristic pattern comprises a device type pattern.

6. The computer-implemented method of claim 4, wherein the characteristic pattern comprises a location context pattern.

7. The computer-implemented method of claim 4, wherein the characteristic pattern comprises a network type pattern.

8. The computer-implemented method of claim 1, wherein each of the one or more user controls is programmed to perform one or more defined functions within an instance of the distributed mobile device application.

9. The computer-implemented method of claim 1, comprising:
 adding one or more program hooks for dynamic runtime adaptation of client device behavior based on the one or more remote commands.

10. The computer-implemented method of claim 9, wherein said adding the one or more program hooks comprises augmenting source code associated with the distributed mobile device application with one or more application programming interface invocations and annotations.

11. The computer-implemented method of claim 1, wherein said detecting comprises monitoring client device-server activity of the distributed mobile device application across the multiple client devices.

12. The computer-implemented method of claim 1, wherein said separating comprises (i) marking a pre-determined percentage of the client devices as being part of the experimental group and (ii) marking a pre-determined percentage of the client devices as being part of the control group.

13. The computer-implemented method of claim 12, wherein said pre-determined percentages are based on a user-defined policy.

14. The computer-implemented method of claim 1, wherein said verifying comprises monitoring client device-server activity of the distributed mobile device application across the control group of client devices.

15. A computer program product comprising a computer readable storage medium having program instructions embodied therewith, the program instructions executable by a device to cause the device to:
 detect one or more faults arising from execution of application instances of a distributed mobile device application among at least a portion of multiple client devices;
 separate the at least a portion of the multiple client devices into (i) an experimental group and (ii) a control group;
 determine one or more user controls of the distributed mobile device application to be related to the one or more detected faults;
 transmit a first set of one or more remote commands to each application instance among the experimental group of client devices, wherein the first set of one or more remote commands disables the one or more user controls of the distributed mobile device application related to the one or more detected faults;
 transmit a second set of one or more remote commands to each application instance among (i) the experimental group of client devices and (ii) the control group of client devices, wherein the second set of one or more remote commands comprises one or more remedial actions pertaining to the one or more detected faults;
 verify that the one or more remedial actions resolved the one or more detected faults arising from execution of the application instances of the distributed mobile device application among the control group of client devices; and
 transmit a third set of one or more remote commands, subsequent to said verifying, to each application instance among the experimental group of client devices, wherein the third set of one or more remote commands enables the one or more user controls of the distributed mobile device application related to the one or more detected faults.

16. The computer program product of claim 15, wherein said determining comprises identifying a characteristic pattern of the application instances associated with the one or more detected faults.

17. The computer program product of claim 15, wherein the program instructions executable by a computing device further cause the computing device to:
generate one or more notifications related to the one or more faults.

18. The computer program product of claim 15, wherein said detecting comprises monitoring client device-server activity of the distributed mobile device application across the multiple client devices.

19. A system comprising:
a memory; and
at least one processor coupled to the memory and configured for:
detecting one or more faults arising from execution of application instances of a distributed mobile device application among at least a portion of multiple client devices;
separating the at least a portion of the multiple client devices into (i) an experimental group and (ii) a control group;
determining one or more user controls of the distributed mobile device application to be related to the one or more detected faults;
transmitting a first set of one or more remote commands to each application instance among the experimental group of client devices, wherein the first set of one or more remote commands disables the one or more user controls of the distributed mobile device application related to the one or more detected faults;
transmitting a second set of one or more remote commands to each application instance among (i) the experimental group of client devices and (ii) the control group of client devices, wherein the second set of one or more remote commands comprises one or more remedial actions pertaining to the one or more detected faults;
verifying that the one or more remedial actions resolved the one or more detected faults arising from execution of the application instances of the distributed mobile device application among the control group of client devices; and
transmitting a third set of one or more remote commands, subsequent to said verifying, to each application instance among the experimental group of client devices, wherein the third set of one or more remote commands enables the one or more user controls of the distributed mobile device application related to the one or more detected faults.

20. A computer-implemented method, comprising:
detecting one or more faults arising from execution of application instances of a distributed mobile device application among at least a portion of multiple client devices based on client device-server activity of the distributed mobile device application across the multiple client devices;
separating the at least a portion of the multiple client devices into (i) an experimental group and (ii) a control group;
examining multiple device attributes of the at least a portion of multiple client devices to determine one or more of the multiple device attributes that are common across the at least a portion of multiple client devices;
determining one or more user controls of the distributed mobile device application related to the one or more detected faults based on (i) the one or more of the multiple device attributes that are common across the at least a portion of multiple client devices and (ii) a pre-computed dependency graph that describes how different user controls depend on each other;
transmitting a first set of one or more remote commands to each application instance among the experimental group of client devices, wherein the first set of one or more remote commands disables the one or more user controls of the distributed mobile device application related to the one or more detected faults;
transmitting a second set of one or more remote commands to each application instance among (i) the experimental group of client devices and (ii) the control group of client devices, wherein the second set of one or more remote commands comprises one or more remedial actions pertaining to the one or more detected faults;
verifying that the one or more remedial actions resolved the one or more detected faults arising from execution of the application instances of the distributed mobile device application among the control group of client devices; and
transmitting a third set of one or more remote commands, subsequent to said verifying, to each application instance among the experimental group of client devices, wherein the third set of one or more remote commands enables the one or more user controls of the distributed mobile device application related to the one or more detected faults;
wherein the steps are carried out by at least one computing device.

* * * * *